(12) United States Patent
Carminati et al.

(10) Patent No.: US 10,156,275 B2
(45) Date of Patent: Dec. 18, 2018

(54) BRAKING BAND OF A DISC FOR A DISC BRAKE

(71) Applicant: Freni Brembo S.p.A., Curno, Bergamo (IT)

(72) Inventors: Fabiano Carminati, Curno (IT); Simone Biondo, Curno (IT); Stefano Medici, Curno (IT)

(73) Assignee: Freni Brembo S.p.A., Curno (IT)

( * ) Notice: Subject to any disclaimer, the term of this patent is extended or adjusted under 35 U.S.C. 154(b) by 0 days.

(21) Appl. No.: 15/501,521

(22) PCT Filed: Aug. 3, 2015

(86) PCT No.: PCT/IB2015/055874
§ 371 (c)(1),
(2) Date: Feb. 3, 2017

(87) PCT Pub. No.: WO2016/020820
PCT Pub. Date: Feb. 11, 2016

(65) Prior Publication Data
US 2017/0219035 A1    Aug. 3, 2017

(30) Foreign Application Priority Data
Aug. 5, 2014   (IT) .............................. MI2014A1431

(51) Int. Cl.
*F16D 65/12*   (2006.01)
*F16D 65/02*   (2006.01)

(52) U.S. Cl.
CPC ........... *F16D 65/127* (2013.01); *F16D 65/12* (2013.01); *F16D 65/123* (2013.01); *F16D 2065/1304* (2013.01); *F16D 2065/1332* (2013.01)

(58) Field of Classification Search
CPC ................. F16D 65/127; F16D 65/123; F16D 2065/1304

USPC ......................................... 188/218 XL, 77 W
See application file for complete search history.

(56) References Cited

U.S. PATENT DOCUMENTS

| | | | | |
|---|---|---|---|---|
| 4,396,100 | A | * | 8/1983 | Eltze ..................... F16D 13/648 188/264 D |
| 4,995,500 | A | * | 2/1991 | Payvar .................... F16D 13/72 188/218 XL |

(Continued)

FOREIGN PATENT DOCUMENTS

| WO | WO 2004/020862 A1 | 3/2004 |
|---|---|---|
| WO | WO 2012/083369 A1 | 6/2012 |

*Primary Examiner* — Vishal R Sahni
(74) *Attorney, Agent, or Firm* — Blank Rome LLP

(57) ABSTRACT

A braking band (14) of a disc for a disc brake (100) suitable to rotate about a rotation axis (A-A), said braking band comprising opposite annular braking surfaces (16, 18) which extend from an inner edge (20) facing towards the rotation axis (A-A) to an outer edge (22) facing towards the outside of the disc, said braking band (14) having a distribution of grooves (44, 48, 52, 101, 103, 105, 107, 109, 111, 113) on at least one of the braking surfaces (16, 18), said distribution, or distribution assembly of grooves, having a pattern or module (42, 43) which is repeated circumferentially, each of said grooves (44, 48, 52, 101, 103, 105, 107, 109, 111, 113) being a closed groove which extends in a main direction of extension (46, 50, 54, 102, 104, 106, 108, 110, 112, 114) which defines a direction (46a, 50a, 54a, 102a, 104a, 106a, 108a, 110a, 112a, 114a) of said groove, each groove further extending without intersecting other grooves, said module (42, 43) extends from an inner radius (r1) to an outer radius (r2), said radii defining an annular portion of said braking (Continued)

surface having said grooves, said module (42, 43) comprising a first groove (44 and/or 105), which extends without interruption substantially from said inner radius (r1) to said outer radius (r2), as well as at least a second (48 and/or 107) and a third groove (52 and/or 109) with lesser extensions than said first groove (44), said first, second and third grooves (44, 48, 52 and/or 105, 107, 109) of the same module (42 or 43) have extensions parallel to one another, wherein said second groove (48 and/or 107) has a greater extension than said third groove (52 and/or 109), and wherein said at least first, second and third grooves (44, 48, 52 and/or 105, 107, 109) are positioned alongside one another and said second groove (48 and/or 107) is positioned between said first groove (44 and/or 105) and said third groove (52 and/or 109), and wherein the extension of said first groove is suitable to affect the entire area touched by at least one brake pad (124) suitable to act in conjunction with said annular braking surface (16 and/or 18) to exert a braking action, and wherein at any point in the direction of extension of each groove, said direction of extension (46*a*, 50*a*, 54*a*, 102*a*, 104*a*, 106*a*, 108*a*, 110*a*, 112*a*, 114*a*), or its rectilinear prolongation, forms an acute angle with respect to a radial direction (R-R) or a prolongation of the inner radius (r1) or of the outer radius (r2).

10 Claims, 12 Drawing Sheets

(56) References Cited

U.S. PATENT DOCUMENTS

| | | | | |
|---|---|---|---|---|
| 5,176,236 | A * | 1/1993 | Ghidorzi | F16D 13/64 |
| | | | | 188/218 XL |
| 5,671,835 | A * | 9/1997 | Tanaka | F16D 13/64 |
| | | | | 188/264 D |
| 6,446,770 | B2 * | 9/2002 | Qian | F16D 65/12 |
| | | | | 188/218 XL |
| 6,711,895 | B1 * | 3/2004 | Miura | F16C 17/04 |
| | | | | 192/113.22 |
| 8,851,245 | B2 * | 10/2014 | Bielis, IV | F16D 65/127 |
| | | | | 188/218 XL |
| 2004/0040802 | A1 * | 3/2004 | Veneziano | F16D 65/128 |
| | | | | 188/218 XL |
| 2004/0084261 | A1 * | 5/2004 | Burgoon | F16D 65/0006 |
| | | | | 188/218 XL |
| 2008/0067018 | A1 | 3/2008 | Smith et al. | |
| 2009/0266653 | A1 * | 10/2009 | Antanaitis | F16D 65/12 |
| | | | | 188/72.1 |

* cited by examiner

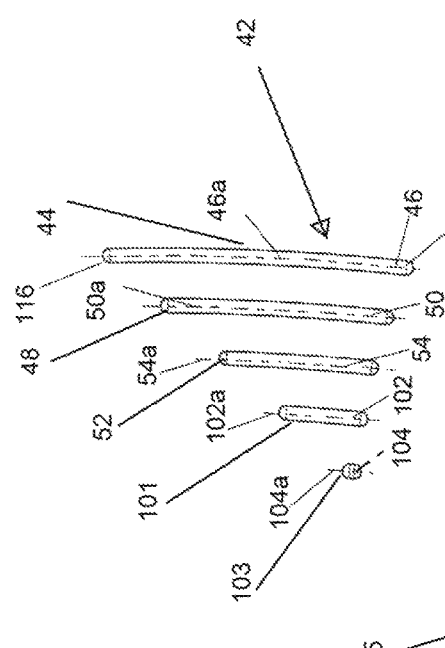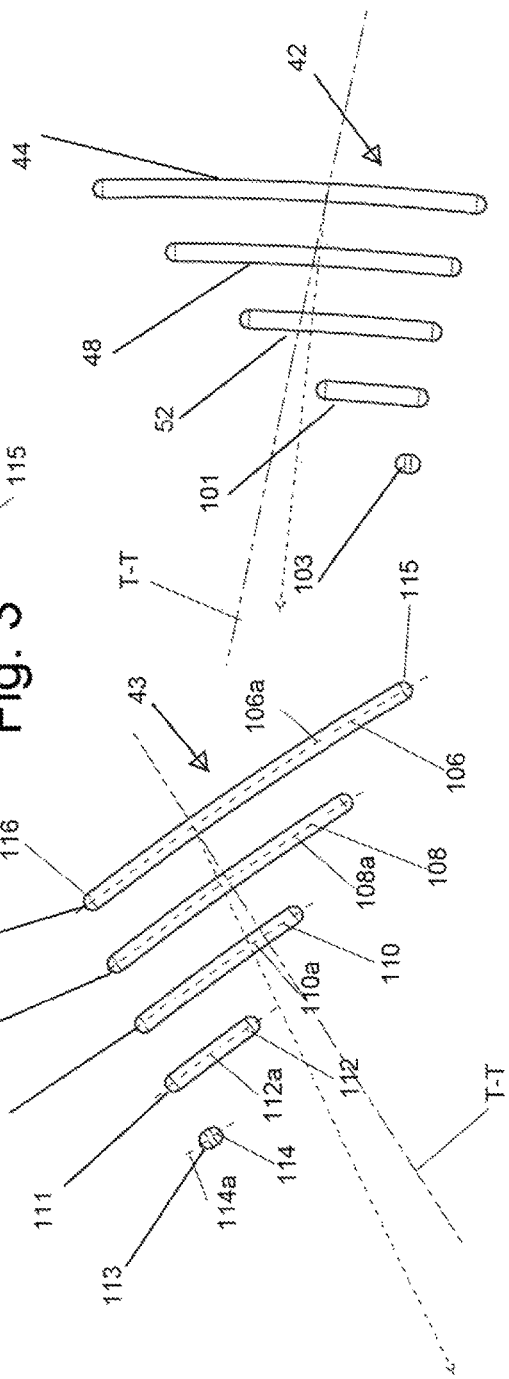
Fig. 3
Fig. 4

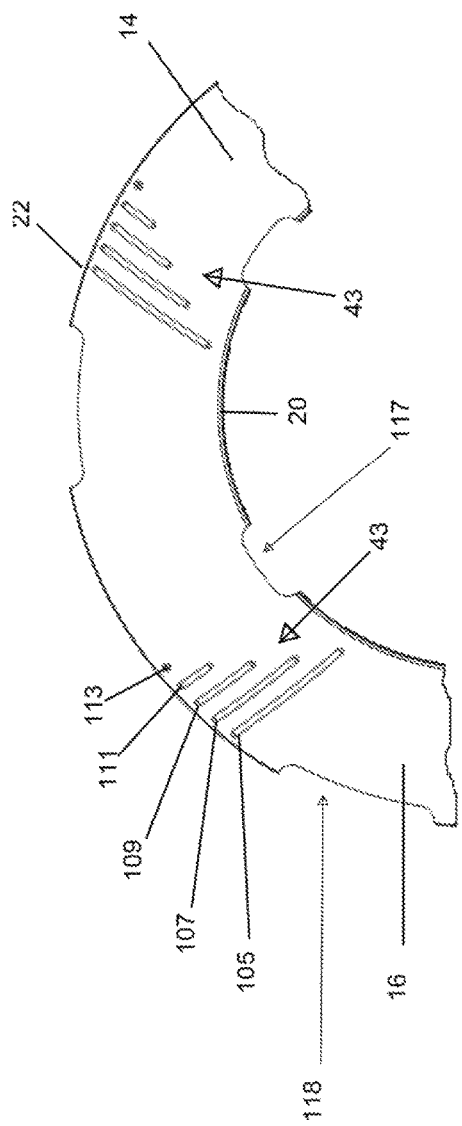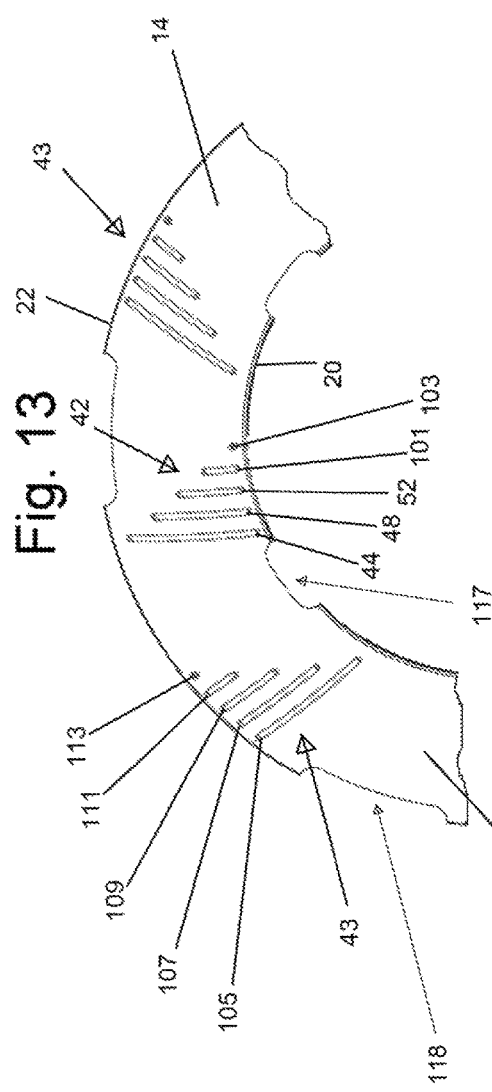

BRAKING BAND OF A DISC FOR A DISC BRAKE

FIELD OF THE INVENTION

The present invention relates to a braking band of a disc for a disc brake, and to a disc for a disc brake.

In particular, the present invention relates to a braking band provided with at least one grooved braking surface.

BACKGROUND ART

Grooved rotors for discs and clutches are known for example from WO 2004/020862 which shows the features of the preamble of claim 1, as well as from WO02/06694, JP 2017235, U.S. Pat. No. 5,671,835, U.S. Pat. No. 4,726,455, JP 10026159, JP 08145091, JP 55054733, SU 1484995, DE 2507264, JP 63259227, DE 262061, JP 62-209234, DE 198 24 465, U.S. Pat. No. 5,735,366, U.S. Pat. No. 5,176,236, U.S. Pat. No. 4,995,500, U.S. Pat. No. 4,286,694, U.S. Pat. No. 5,101,953, U.S. Pat. No. 4,379,501, U.S. Pat. No. 5,474,161, U.S. Pat. No. 5,480,007, U.S. Pat. No. 5,662,192, U.S. Pat. No. 5,765,667, U.S. Pat. No. 5,819,888, EP 0 287 017, GB 2 268 552, WO 97/43559, U.S. Pat. No. 2,144,223, U.S. Pat. No. 2,835,355, U.S. Pat. No. 3,623,577, U.S. Pat. No. 3,809,192, U.S. Pat. No. 3,972,400, U.S. Pat. No. 4,396,100, U.S. Pat. No. 4,726,455, U.S. Pat. No. 5,358,086, U.S. Pat. No. 5,682,971, FR 2,561,732, U.S. Pat. No. 2,728,421, U.S. Pat. No. 3,425,524, U.S. Pat. No. 5,671,835, U.S. Pat. No. 6,446,770, and also from the 1993 catalog "Wilwood disc brakes" (Wilwood engineering Inc.) and from the 1999 catalog Biltemakatalogen (Sweden).

Known grooved bands have a non-optimal distribution of grooves for the purposes of achieving an optimal average friction coefficient, as well as of achieving the balance of stresses on the brake pads and thus the elimination of the vibrations caused on the disc and on the brake pad by their interaction during the braking action.

In known braking bands, main rotation direction of the disc means the rotation direction corresponding to the forward travel of the vehicle.

Radial direction (R-R) indicates a direction lying on a plane perpendicular to the rotation axis (A-A) of the braking band and intersecting the rotation axis itself.

Tangential direction (T-T) indicates a direction tangent to a circumference lying on a plane perpendicular to the rotation axis of the braking band and having a point of the rotation axis itself as its center. Such a circumference defines a circumferential direction of the disc.

Solution

It is the object of the present invention to devise and provide a braking band and a disc for a disc brake which allow to obviate the above-complained drawbacks.

Such an object is achieved by a braking band in accordance with claim 1, and by a disc for a disc brake in accordance with claim 10.

Certain advantageous embodiments are the subject of the dependent claims.

DRAWINGS

Further features and advantages of the assembly according to the invention will become apparent from the following description of preferred, non-limiting exemplary embodiments thereof, with reference to the accompanying drawings, in which:

FIG. 3 depicts a module of grooves suitable to be used on a braking surface of a braking band;

FIG. 4 depicts a pair of modules of grooves identical to each other but angularly spaced according to a circumferential direction and overturned with respect to a circumferential direction passing through the centerline of the braking band or preferably of the portion of the braking band touched by a brake pad;

Figure 1:
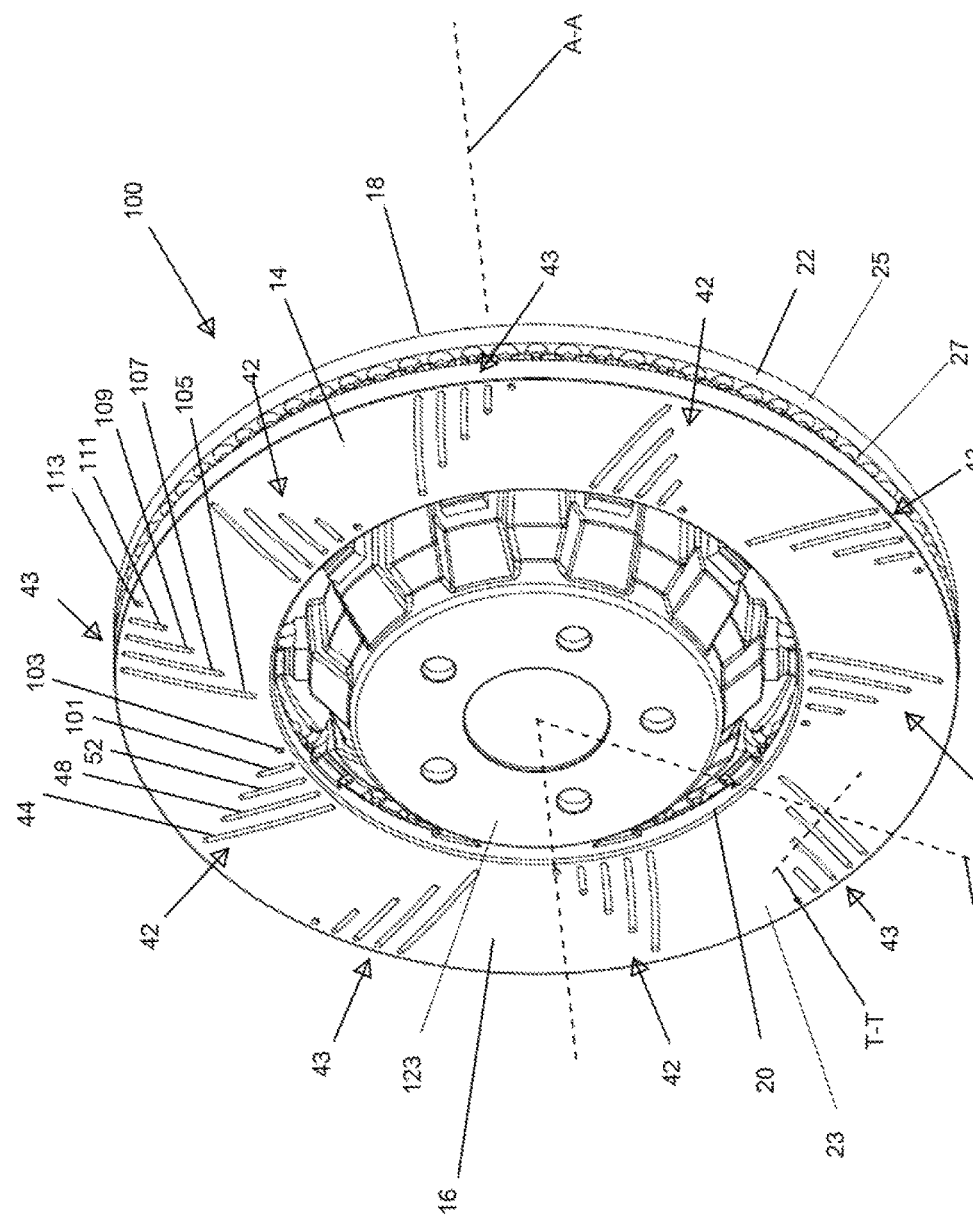
FIG. 1 depicts a perspective view of a disc for a disc brake.
Figure 2:
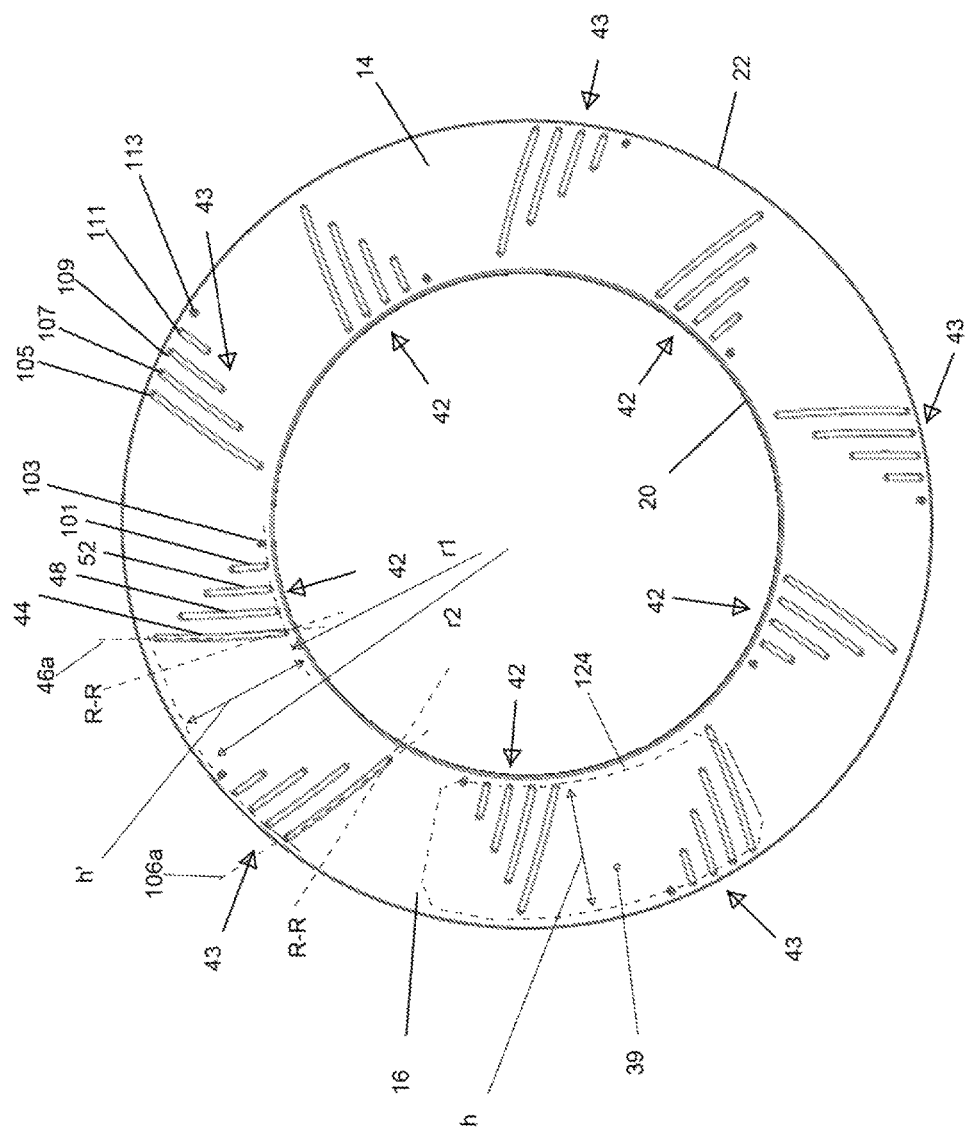
FIG. 2 depicts a front view of a braking band for a braking disc.
Figure 5:
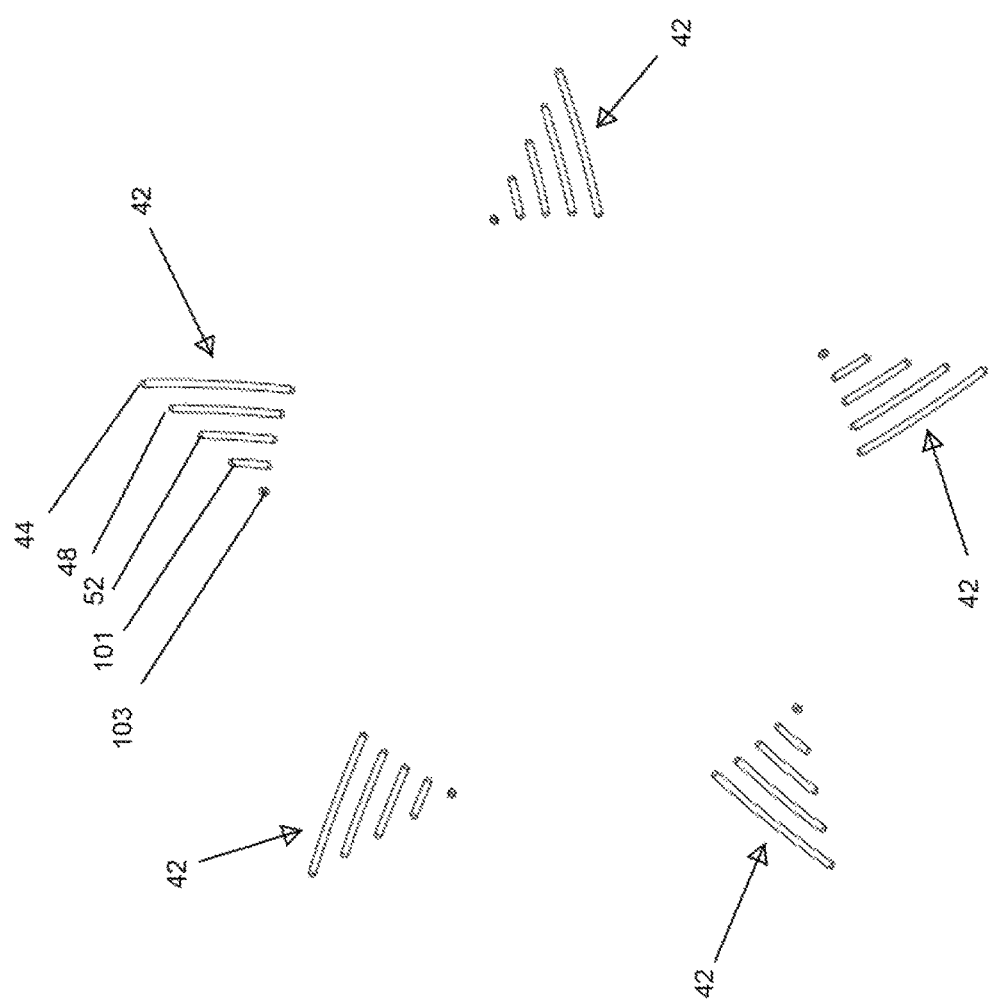
FIG. 5 depicts an assembly of five identical modules distributed so as to be equally spaced circumferentially to form a star assembly of modules of grooves.
Figure 6:
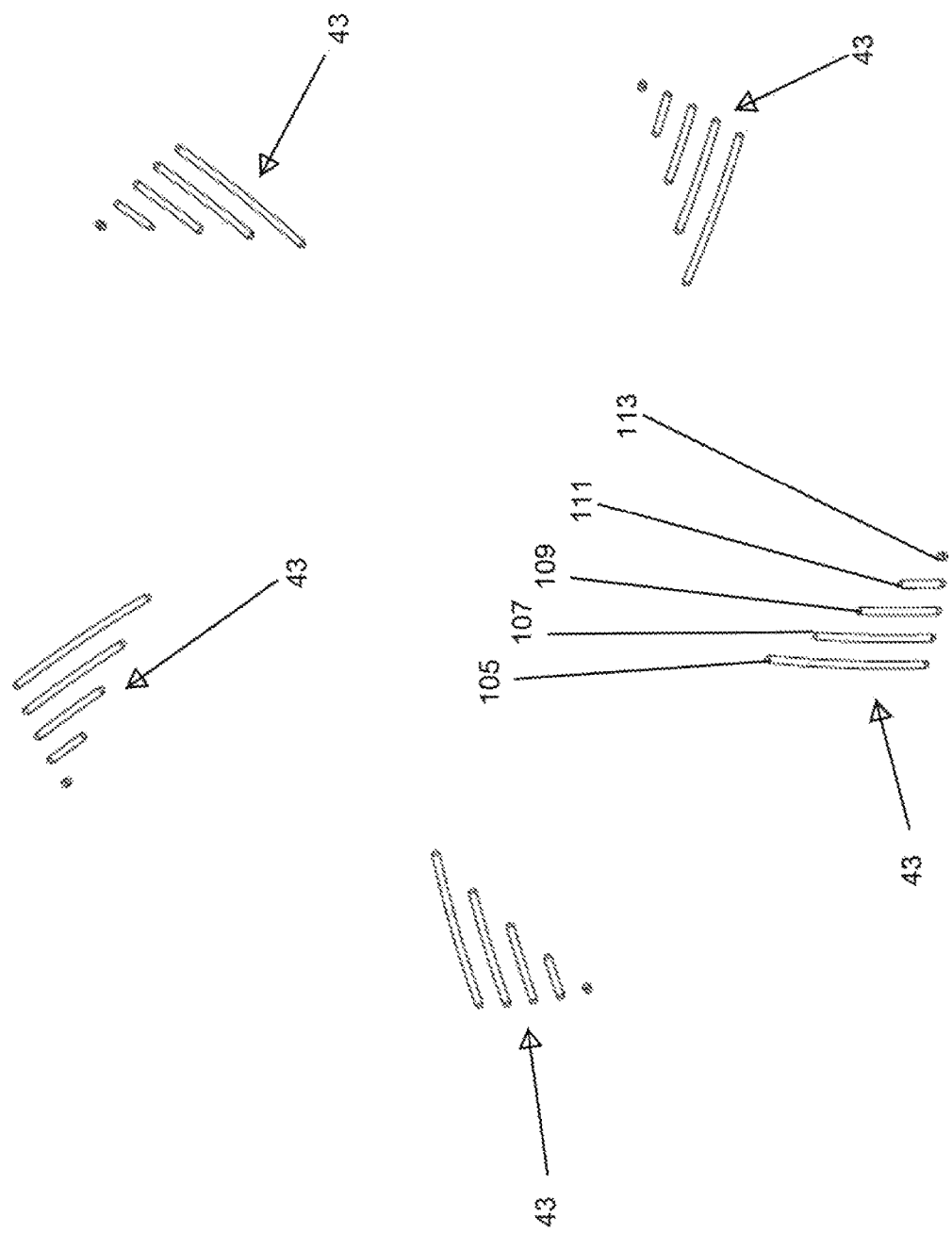
FIG. 6 depicts an assembly of five identical modules distributed so as to be equally spaced circumferentially to form a star assembly of modules of grooves, but symmetrical with respect to those in FIG. 5 with respect to a circumferential centerline direction of the braking band.
Figure 7:
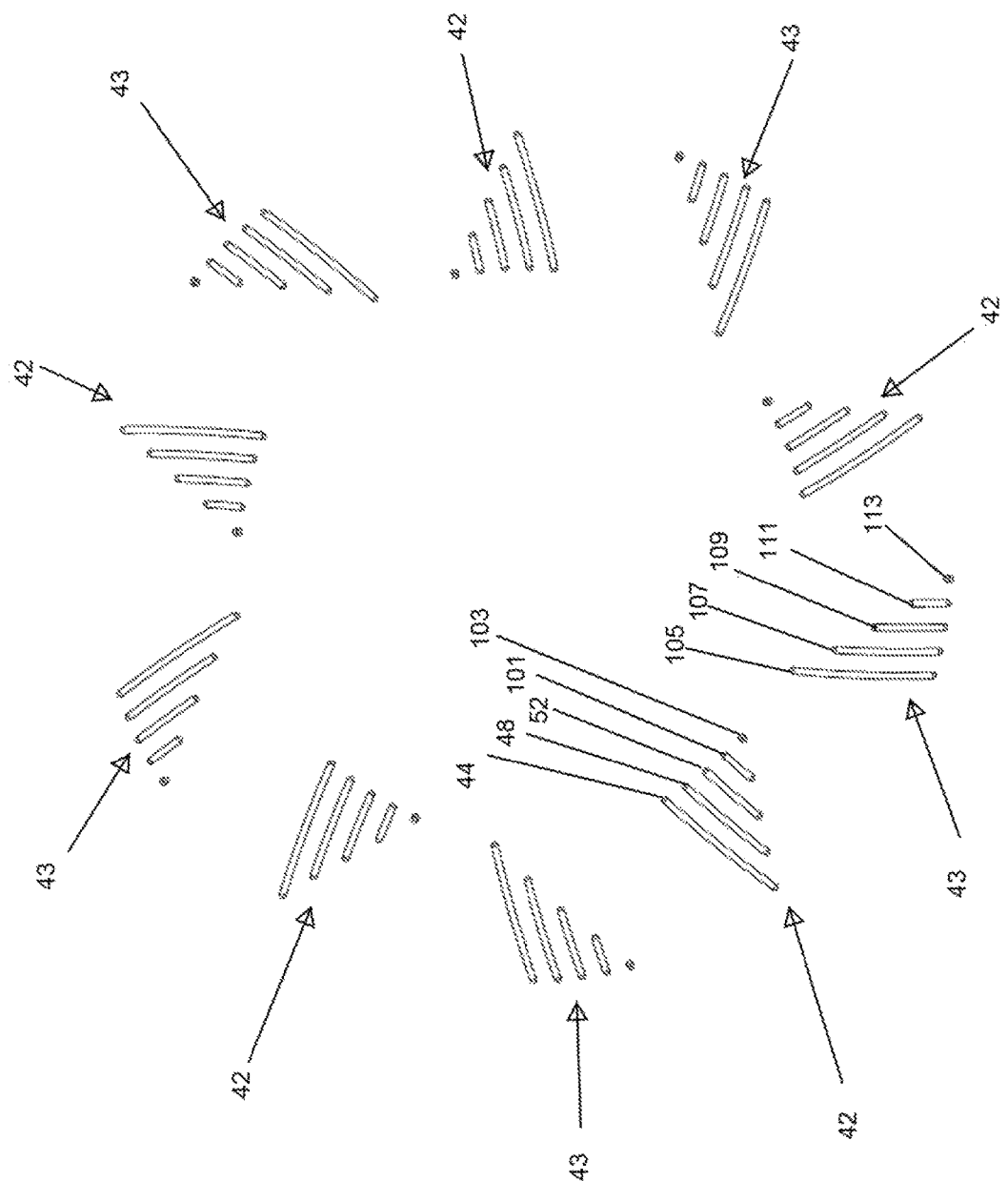
Figure 8:
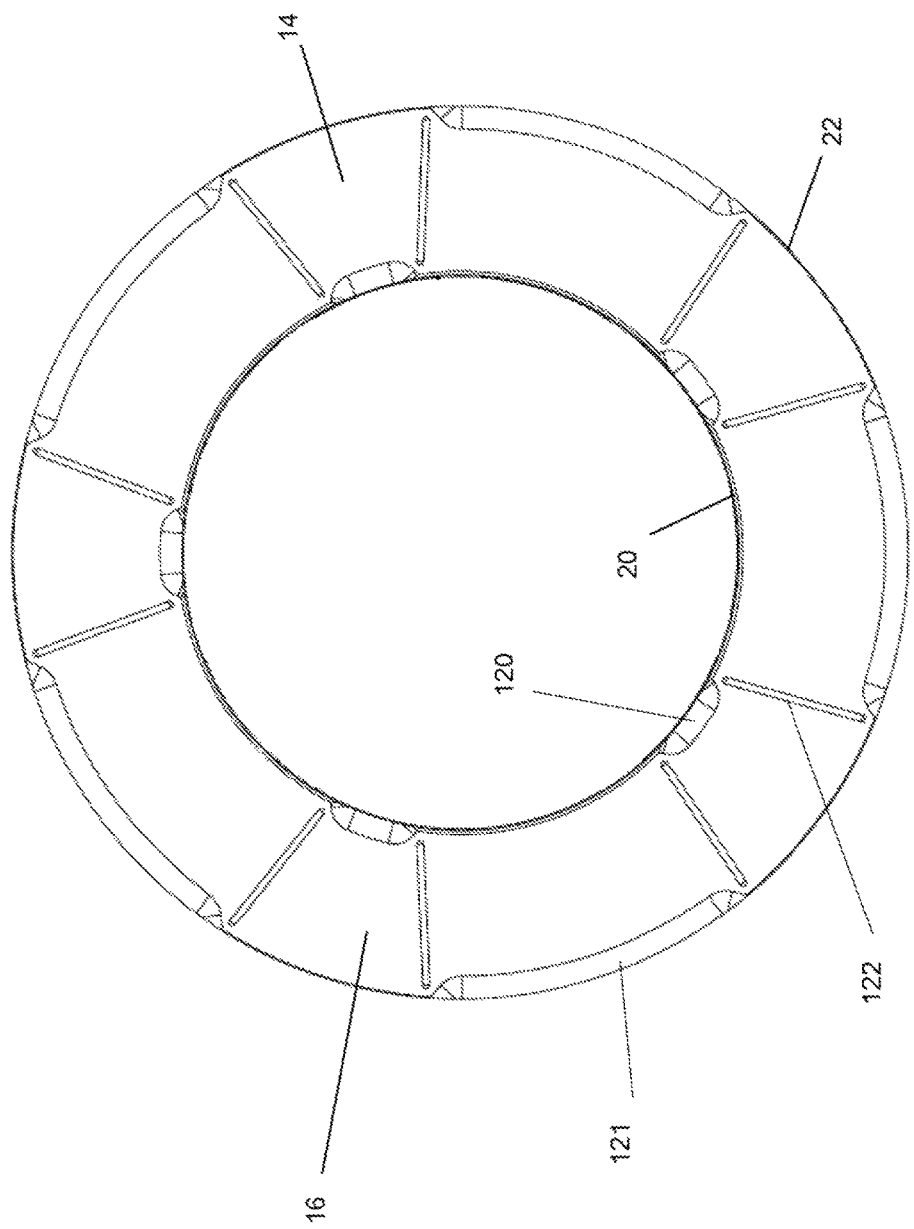
Figure 9:
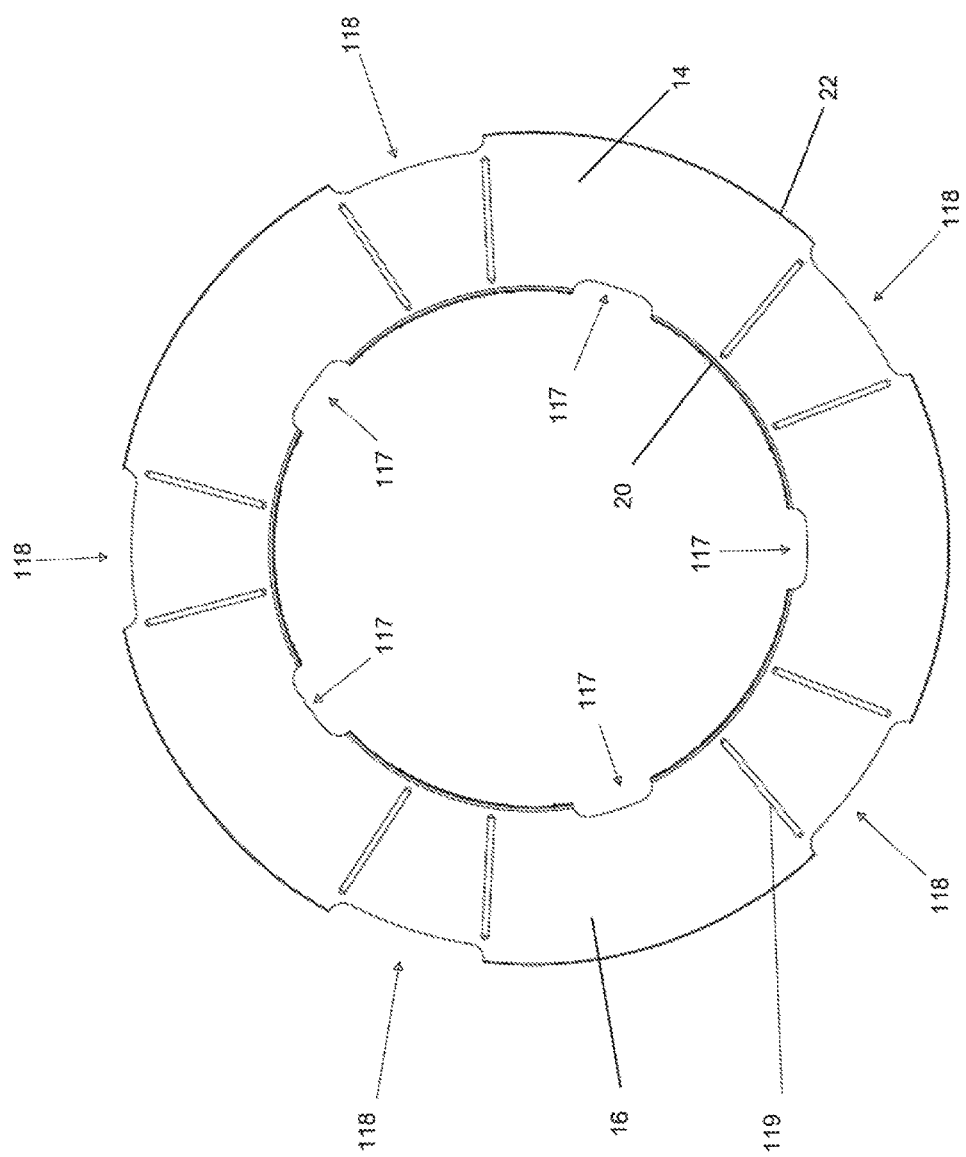
Figure 10:
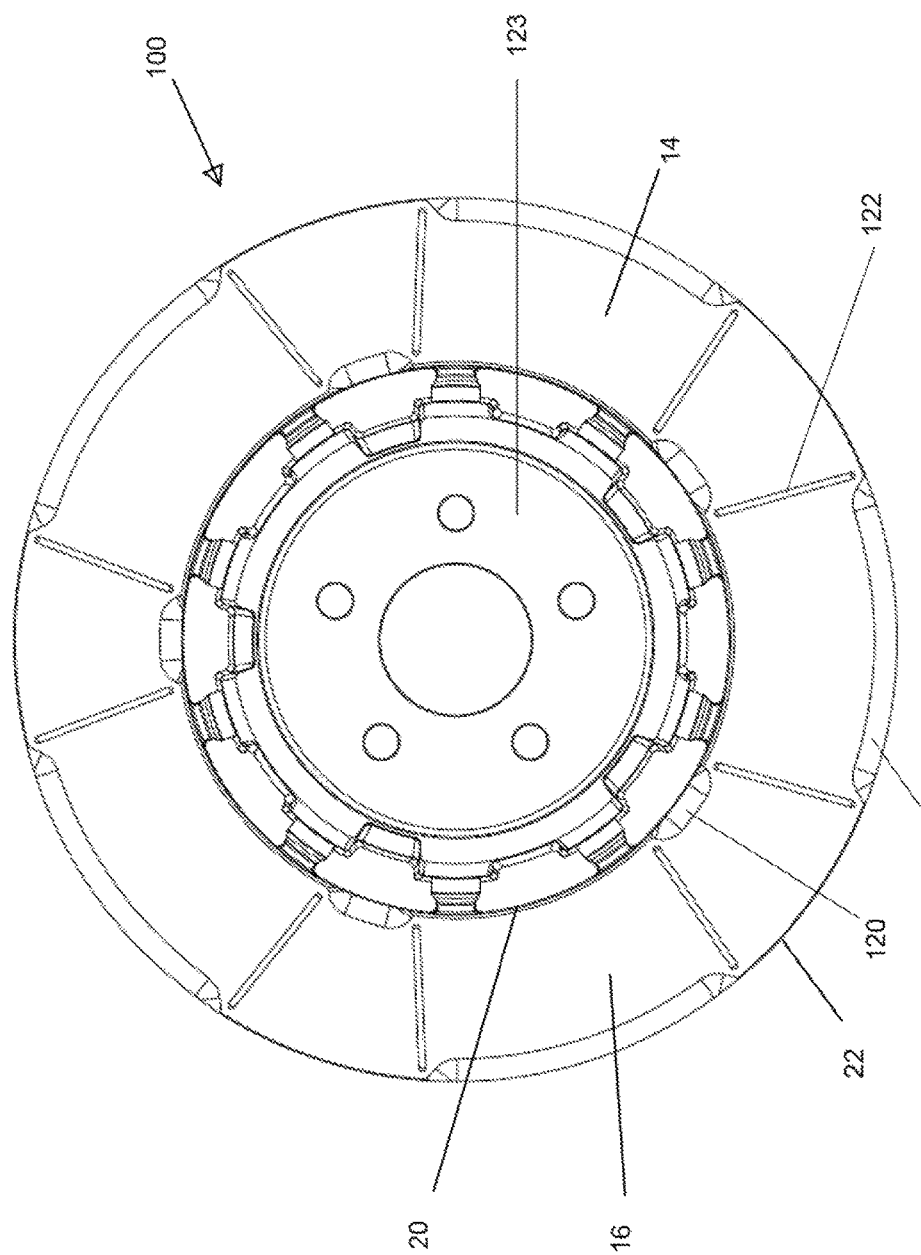
Figure 11:
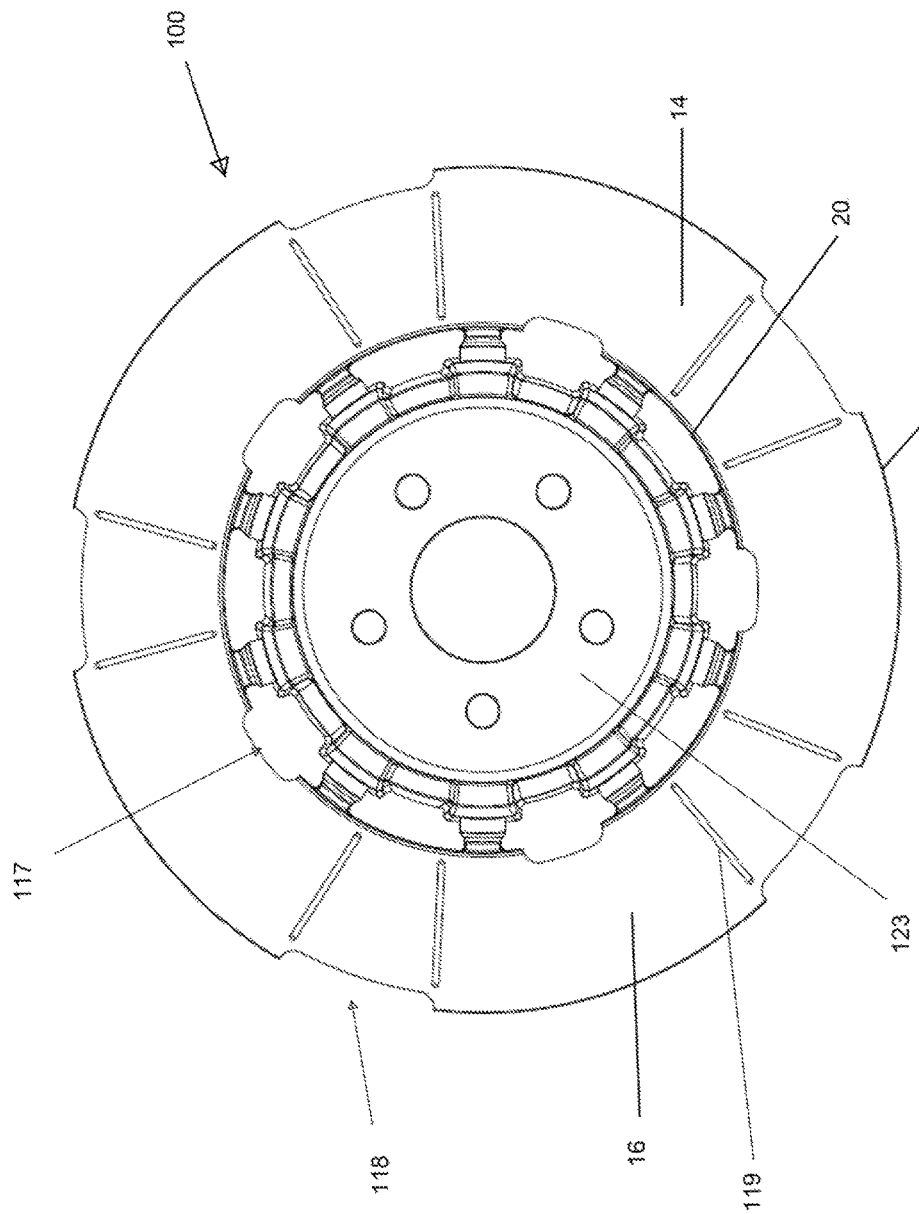
Figure 12:
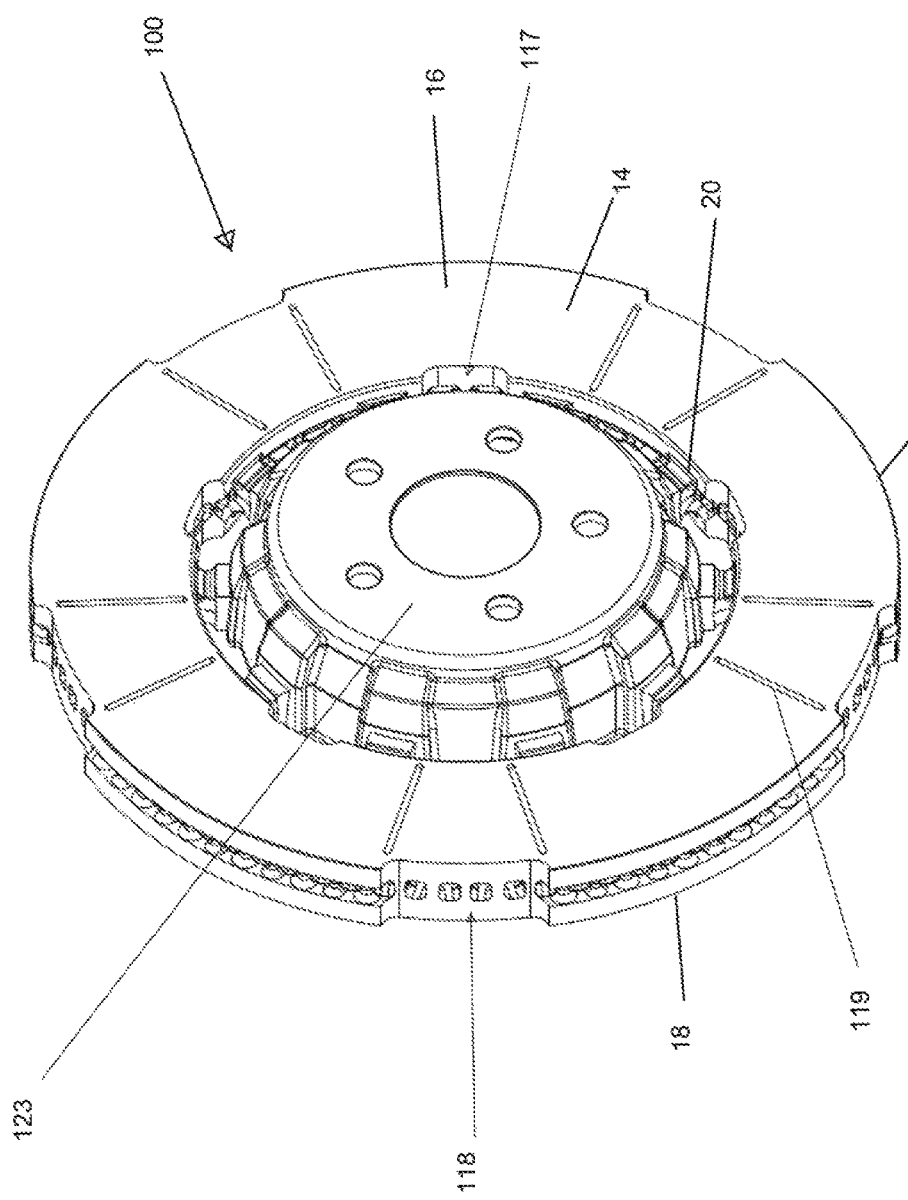

FIG. 7 depicts a double assembly of five identical modules distributed so as to be equally spaced circumferentially to form a star assembly of modules of grooves, and of five identical modules distributed so as to be equally spaced circumferentially to form a star assembly of modules of grooves but symmetrical as compared to those in FIG. 5 with respect to a circumferential centerline direction of the braking band, where all ten modules are equally spaced circumferentially;

FIG. 8 depicts a braking band having chamfers on the inner edge and on the outer edge, which are equally spaced from each other circumferentially;

FIG. 9 depicts a braking band having raised portions of the inner edge and lowered portions of the outer edge, which are equally spaced from each other circumferentially;

FIG. 10 depicts a disc for a disc brake having a braking band having chamfers on the inner edge and on the outer edge, which are equally spaced from each other circumferentially;

FIG. 11 depicts a disc of a braking disc having a braking band having raised portions of the inner edge and lowered portions of the outer edge, which are equally spaced from each other circumferentially;

FIG. 12 depicts a perspective view of the disc in FIG. 11;

FIG. 13 depicts a braking band having raised portions of the inner edge and lowered portions of the outer edge, which are equally spaced from each other circumferentially, and modules which are distributed so as to be equally spaced circumferentially to form a star assembly of modules of grooves with the base being close to the outer edge;

FIG. 14 depicts a braking band having raised portions of the inner edge and lowered portions of the outer edge, which are equally spaced from each other circumferentially, and a double assembly of identical modules, which are distributed so as to be equally spaced circumferentially to form a first star assembly of modules of grooves and of a second assembly of identical modules, which are distributed so as to be equally spaced circumferentially to form a star assembly of modules of grooves but which are symmetrical with respect to the previous ones with respect to a circumferential centerline direction of the braking band, where all the modules are equally spaced circumferentially.

DESCRIPTION OF SOME PREFERRED EXEMPLARY EMBODIMENTS

With reference to the figures, reference 14 indicates a braking band of a disc for a disc brake 100. The aforesaid disc is particularly suitable for applications on high-performance vehicles, such as for example competitive or racing vehicles.

Reference A-A indicates a rotation axis of the disc which, according to one possible embodiment, forms a symmetry axis of the disc itself. However, an axial direction parallel to the rotation axis is indicated by the same reference A-A in the description and drawings.

In the figures shown, reference R indicates the main rotation direction of the disc, i.e. the rotation direction corresponding to the forward travel of the vehicle.

Radial direction r indicates a direction lying on a plane perpendicular to the rotation axis A-A and intersecting the rotation axis itself. With reference to the radial direction R-R, an inner portion is a portion close to the rotation axis A-A, while an outer portion is a portion far from the rotation axis A-A and close to the outside of the disc.

Tangential direction T-T indicates a direction tangent to a circumference lying on a plane perpendicular to the rotation axis A-A and having a point of the rotation axis as its center. Such a circumference defines a circumferential direction of the disc.

The disc comprises a support bell 123 suitable to connect the disc to a hub of a vehicle, for example by means of through holes provided in a portion thereof. The disc further comprises the braking band 14 suitable to be supported by the bell.

According to one possible embodiment, the braking band and the bell are made in two separate pieces suitable to be connected to each other for example by creating a tangential constraint, an axial constraint, and in certain cases, a radial constraint, or by means of a co-melting process.

Numeral references 16 and 18 indicate two opposite braking surfaces which laterally delimit the braking band 14. Braking surface indicates an annular surface of the braking band, coaxial with the rotation axis A-A and extending in radial direction over a height H corresponding to the distance between an inner edge 20 and an outer edge 22 of the braking band 14. The inner edge 20 faces the rotation axis A-A while the outer edge 22 faces the outside of the disc.

The two braking surfaces are defined as opposite because they are arranged on opposite sides of a mid-plane of the braking band perpendicular to the rotation axis A-A.

In accordance with one possible embodiment, the braking band 14 is of the ventilated type, i.e. it comprises two plates 24 and 26 facing each other so as to form an air discharge gap or channel 28. With reference to the disc mounted on a vehicle, numeral 24 indicates an outer plate, i.e. which faces the outside of the vehicle, and numeral 26 indicates an inner plate, i.e. which faces the inside of the vehicle. Each plate 24, 26 defines a corresponding braking surface 16, 18.

According to one possible embodiment, the two plates are connected to each other by means of connection elements which extend from one plate to the other mainly inside gap 28.

According to one possible embodiment, the connection elements comprise wings shaped so as to delimit ventilation conduits. One wing comprises a wall having a main direction of extension, i.e. a wall in which the length assessed along the main direction of extension is much greater than the thickness assessed according to a direction transversal to the main direction of extension. The main direction of extension of a wing is substantially defined by the midline of the wing with respect to the thickness thereof.

Each wing and each main direction of extension define a direction of extension of the wing. Such a direction of extension can be defined as the straight line according to which the wing substantially extends. In the case of rectilinear wings, the main direction of extension substantially coincides with the direction of extension. In the case of arched wings, the direction of extension can always be defined for example by the arched line passing through the two ends of the wing.

According to one possible embodiment, the direction of extension of all wings is inclined with respect to a radial direction r, and in particular, is inclined in a direction opposite to the main rotation direction R of the disc.

According to one possible embodiment, the wings and the respective main directions of extension are arched both when the wing is continuous and when it is interrupted, and they have concavities facing the direction opposite to the rotation direction. In other words, taking as reference a radius or vector orthogonal to the main direction of extension or to the direction of extension of the wing and directed towards the center of curvature of the arched line defining the direction of extension, this vector is directed in a direction opposite to the main rotation direction R.

According to one possible embodiment in which the wings are arched, they are inclined with respect to a radial direction r so that the above-defined vector is substantially directed towards the inside of the disc, with respect to an average circumference of the braking band 14.

According to one possible embodiment, the main direction of extension of a wing is a portion of circumference with center arranged in a portion inside the braking band. In this case, the vector corresponds to the radius of the circumference with its direction facing the center of the circumference itself.

The braking surfaces are suitable to act in conjunction with opposite brake pads 124 of a brake caliper (shown with a dotted line), arranged astride the disc. According to one possible embodiment, the brake pads comprise a portion of friction material supported by a plate.

When the braking action is exerted, the friction material is stressed and pushed against the braking band thus contacting the corresponding braking surface. Contact area 40 means a portion of the braking surface corresponding to the area which contacts the friction material of the brake pad when the braking action is exerted. When the disc rotates about its axis A-A, the braking band is touched by the contact area 40 along the entire circumferential extension thereof.

According to one possible embodiment, touched height h of the braking surface 14 means the height of the contact area 40, corresponding to the height of the friction material of the brake pad, assessed in radial direction with respect to the disc. The touched height h on the corresponding braking surface extends in radial direction r with respect to the disc, between an inner circumference and an outer circumference. The inner circumference is arranged in the inner portion of the braking surface but slightly outside with respect to the aforesaid inner edge 20, while the outer circumference is arranged in the outer portion of the braking surface but slightly inside with respect to the aforesaid outer edge 22. The touched height h is slightly less than height H of the respective braking surface.

According to one possible embodiment, the wings extend in the radial direction r over a stretch of the braking band which is smaller than the height H of the respective braking surface. According to one possible embodiment, the wings extend in the radial direction r over a stretch of the braking band which is smaller than or equal to the touched height h of the respective braking surface.

According to one possible embodiment, at least one of the two braking surfaces 16, 18 comprises a plurality of grooves or hollows.

According to one possible embodiment, the grooves are arranged according to an even distribution inside the respective braking surface.

According to one possible embodiment, the grooves are arranged according to an even distribution having a pattern or module 42 and/or 43 which is periodically repeated in the circumferential direction along the entire braking surface.

Each groove is closed, i.e. has ends which do not lead outside the braking band but remain inside the height H of the braking surface. In other words, the grooves are distributed in an annular portion of the braking surface which has, in the radial direction r with respect to the disc, a smaller height than the height H of the braking surface. According to one possible embodiment, the grooves are distributed in an annular portion of the braking surface which has, in a radial direction r with respect to the disc, a height h'—also called "scraped" height—which is smaller than, or equal to, the touched height h of the friction material of the brake pads.

In other words again, the grooves are distributed in an annular portion of the braking surface which extends from an inner radius r1 to an outer radius r2, said radii falling within the braking surface. Inner radius r1 means a radius which falls within an area of the braking band facing the rotation axis A-A, outer radius r2 means a radius which falls in an area of the braking band facing the outside of the disc.

In accordance with one possible embodiment, there are, in this order, the inner edge 20 of the braking surface, the inner circumference of the contact area, the inner radius r1, the outer radius r2, the outer circumference of the contact area, and the outer edge 22 of the braking surface, according to a direction r radial to the disc and according to a centrifugal direction.

In other words again, closed groove means a groove, the edge of which is defined by the intersection between the braking surface and the recess of the groove, is a line closed on itself.

The radial extension of the portion having the grooves coincides with the radial extension of module 42 and/or 43, as defined above.

The aforesaid module 42 and/or 43 comprises a first groove 44 a 105, also simply defined as long groove, which has a main direction of extension 46 and/or 106, i.e. a line along which the first groove extends over a length which is much greater than the thickness of the groove assessed according to a direction transversal to the main direction of extension. The main direction of extension 46 and/or 106 is substantially defined by the midline of the groove with respect to the thickness thereof.

Direction of extension means the straight or curved line according to which the groove substantially extends, depicted for example by the straight line which joins the two ends of the groove.

According to one possible embodiment, the long groove 44 and/or 105 extends on the respective braking surface over a stretch substantially equal to height h' which is less than or equal to the touched height h.

According to one possible embodiment, the direction of extension of the first groove 44 and/or 105 is inclined with respect to a radial direction r, and in particular, is inclined in a direction opposite to the rotation direction R of the disc.

According to one possible embodiment, the first groove 44 and/or 105 extends along said main direction of extension 46 and/or 106 over a greater length than both the height h' of the portion affected by the grooves and the touched height h of the respective braking surface.

According to one possible embodiment, the main direction of extension 46 and/or 106 of the first groove 44 and/or 105 is arched and has a concavity facing according to the rotation direction R of the disc. In other words, taking as reference a radius or vector orthogonal to the main direction of extension 46 and/or 106 or to the direction of extension of the long groove 44 and/or 105 and directed towards the center of curvature of the line defining the direction of extension itself, this vector is directed according to the main rotation direction R.

According to one possible embodiment in which the long grooves 44 and 105, respectively, are arched, they are inclined with respect to a radial direction r so that the above-defined vector substantially faces the inside and the outside of the disc, respectively, with respect to an average circumference of the braking band 14.

In accordance with one embodiment, the shape of the long groove is similar to a spoon suitable to collect the worn friction material in the rotation direction of the disc. Such an effect is improved by the inclination of the direction of extension of the long groove 44 and 105 and is emphasized by the concavity thereof.

According to one possible embodiment, the main direction of extension of the first groove 44 and 105, respectively, is a portion of circumference, for example having its center arranged in a portion inside and outside the braking band, respectively, with respect to an average circumference of the braking band.

According to one possible embodiment, the main direction of extension 46 and/or 106 of the first groove 44 intersects the projection on the braking surface of the main direction of extension of at least one wing.

According to one possible embodiment, with respect to a radial direction of the disc, the first groove 44 and 105, respectively, comprises an inner end 115 and an outer end 116, respectively, both closed, i.e. not leading inside or outside the braking band.

According to one possible embodiment, the first groove 44 and/or 105 has an arched section, preferably corresponding to a portion of circumference, on a plane perpendicular to the respective braking surface and to the main direction of extension 46 and/or 106.

Module 42 and/or 43 further comprises a second groove 48 and/or 107. Such a groove has a main direction of extension 50 and/or 108, i.e. a line along which the second groove extends over a length which is much greater than the thickness of the groove assessed according to a direction transversal to the main direction of extension. The main direction of extension 50 and/or 108 is substantially defined by the midline of the groove with respect to the thickness thereof.

According to one possible embodiment, the short inner groove 48 and/or 107 is that immediately after the long groove 44 and/or 105 running along the braking band in a direction opposite to the main rotation direction R of the disc.

According to one possible embodiment, the second groove 48 and/or 107 has an arched section, preferably corresponding to a portion of circumference, on a plane perpendicular to the respective braking surface and to the main direction of extension 50 and/or 108.

Module 42 further comprises a third groove 52 and/or 109, which has a main direction of extension 54 and/or 110, i.e. a line along which the first groove extends over a length which is much greater than the thickness of the groove assessed according to a direction transversal to the main direction of extension. The main direction of extension 54 and/or 110 is substantially defined by the midline of the groove with respect to the thickness thereof.

According to one possible embodiment, each grooves does not intersect with other grooves.

According to one possible embodiment, the arrangement of the grooves on the braking surface, within the area covered by a module, is such that the presence of "voids" and "solids" is evenly distributed on average over the area, the "voids" being the parts of braking surface engaged by the grooves, and the "solids" the portions of braking surface acting in conjunction with the brake pad.

In accordance with a general embodiment of the invention, a braking band 14 of a disc for a disc brake 100 is suitable to rotate about a rotation axis A-A and comprises opposite annular braking surfaces 16, 18 which extend from an inner edge 20 facing towards the rotation axis A-A to an outer edge 22 facing the outside of the disc.

Said braking band 14 has a distribution of grooves 44, 48, 52, 101, 103 and/or 105, 107, 109, 111, 113 on at least one of the braking surfaces 16, 18, said distribution, or distribution assembly of grooves, has a pattern or module 42 and/or 43 which is circumferentially repeated.

Each of said grooves 44, 48, 52, 101, 103 and/or 105, 107, 109, 111, 113 is a closed groove which extends in a main direction of extension 46, 50, 54, 102, 104 and/or 106, 108, 110, 112, 114 defining a direction 46a, 50a, 54a, 102a, 104a and/or 106a, 108a, 110a, 112a, 114a of said groove. Furthermore, each groove extends without intersecting with other grooves.

Said module 42 and/or 43 extends from an inner radius r1 to an outer radius r2, said radii defining an annular portion of said braking surface having said grooves.

Said module 42 and/or 43 comprises at least a first groove 44 and/or 105, which extends without interruption substantially from said inner radius r1 to said outer radius r2, as well as at least a second 48 and/or 107 and a third 52 and/or 109 groove with shorter extensions than said first groove 44.

Said first, second and third grooves 44, 48, 52 and/or 105, 107, 109 of the same module 42 and/or 43 have path extensions parallel to one another.

Said second groove 48 and/or 107 has a greater extension than said third groove 52 and/or 109.

Said at least first, second and third grooves 44, 48, 52 and/or 105, 107, 109 are positioned alongside one another.

Said second groove 48 and/or 107 is positioned between said first groove 44 and/or 105 and said third groove 52 and/or 109.

The extension of said first groove is suitable to affect the entire area touched by at least one brake pad 124 suitable to act in conjunction with said annular braking surface 16 and/or 18 in order to exert a braking action.

At any point in the direction of extension of each groove, said direction of extension 46a, 50a, 54a, 102a, 104a and/or 106a, 108a, 110a, 112a, 114a, or a rectilinear prolongation thereof, forms an acute angle with respect to a radial direction R-R or a prolongation of the inner radius r1 or of the outer radius r2.

In accordance with one embodiment, each module 42 or 43 has five grooves 44, 48, 52, 101, 103 and/or 105, 107, 109, 111, 113.

In accordance with one embodiment, said third groove 52 and/or 109 in each module 42 or 43 has a greater extension than said fourth groove 101 and/or 111.

In accordance with one embodiment, said fourth groove 101 and/or 111 in each module 42 or 43 has a greater extension than said fifth groove 103 and/or 113.

In accordance with one embodiment, said five grooves 44, 48, 52, 101, 103 and/or 105, 107, 109, 111, 113 in each module 42 or are alongside one another and have a decreasing extension starting from the first groove 44 and/or 105.

In accordance with one embodiment, at least one of said grooves 44, 48, 52, 101, 103 and/or 105, 107, 109, 111, 113 extends in a main direction of extension 46, 50, 54, 102, 104 and/or 106, 108, 110, 112, 114) which is curved in shape.

In accordance with one embodiment, each of said grooves 44, 48, 52, 101, 103 and/or 105, 107, 109, 111, 113 extends in a main direction of extension 46, 50, 54, 102, 104 and/or 106, 108, 110, 112, 114 which is curved in shape.

In accordance with one embodiment, all the grooves 44, 48, 52, 101, 103 and/or 105, 107, 109, 111, 113 of the same module 42 or 43 extend in a main direction of extension 46, 50, 54, 102, 104 and/or 106, 108, 110, 112, 114 which is curved in shape, having the same curvature.

In accordance with one embodiment, at least one module has grooves 44, 48, 52, 101, 103 which extend in a curved direction 46, 50, 54, 102, 104 and in which, at each point, the radius of curvature rc1 of said main direction of extension 46, 50, 54, 102, 104, or a prolongation thereof, opens an acute angle with the tangential or circumferential direction T-T of said braking band 14.

In accordance with one embodiment, said radius of curvature rc1 opens an angle towards the rotation axis A-A of the band, starting from the tangential direction T-T.

In accordance with one embodiment, said curved direction 46, 50, 54, 102, 104 faces the inner edge 20 of the braking band 14.

In accordance with one embodiment, at least one module has grooves 105, 107, 109, 111, 113 which extend in a curved direction 106, 108, 110, 112, 114 and in which, at each point, the radius of curvature rc2 of said main direction of extension 106, 108, 110, 112, 114, or a prolongation thereof, opens an acute angle with the tangential or circumferential direction T-T of said braking band 14.

In accordance with one embodiment, said radius of curvature rc2 opens an angle opposite the rotation axis A-A of the band, starting from the tangential direction T-T.

In accordance with one embodiment, said curved direction 106, 108, 110, 112, 114 faces the outer edge 22 of the braking band 14.

In accordance with one embodiment, at least five modules 42 of identical shape are provided, which are circumferentially repeated and are equally spaced from one another to form a configuration similar to the radii of a five-pointed star, for example with the base facing the inner edge 20.

In accordance with one embodiment, each of the five modules 42 has grooves 44, 48, 52, 101, 103 which extend in a curved direction 46, 50, 54, 102, 104 and in which, at each point, the radius of curvature rc1 of said main direction of extension 46, 50, 54, 102, 104, or a prolongation thereof, opens an acute angle with the tangential or circumferential direction T-T of said braking band 14.

In accordance with one embodiment, said radius of curvature rc1 opens an angle towards the rotation axis A-A of the band, starting from the tangential direction T-T.

In accordance with one embodiment, said curved direction 46, 50, 54, 102, 104 faces the inner edge 20 of the braking band 14.

In accordance with one embodiment, at least five modules of identical shape are provided, which are circumferentially repeated and are equally spaced from one another to form a configuration similar to the radii of a five-pointed star, for example with the base facing the outer edge 22.

In accordance with one embodiment, each of the five modules 43 has grooves 105, 107, 109, 111, 113 which extend in a curved direction 106, 108, 110, 112, 114 and in which, at each point, the radius of curvature rc2 of said main direction of extension 106, 108, 110, 112, 114, or a prolongation thereof, opens an acute angle with the tangential or circumferential direction T-T of said braking band 14.

In accordance with one embodiment, said radius of curvature rc2 opens an angle opposite the rotation axis A-A of the band, starting from the tangential direction T-T.

In accordance with one embodiment, said curved direction 106, 108, 110, 112, 114 faces the outer edge 22 of the braking band 14.

In accordance with one embodiment, all the grooves of the same module 44, 48, 52, 101, 103 and/or 105, 107, 109, 111, 113 comprise an end 115 and/or 116 aligned therebetween in the same circumferential direction.

In accordance with one embodiment, all the grooves 44, 48, 52, 101, 103 of a first module 42 comprise an end 115 aligned with each other in the same circumferential direction near the inner edge 20 of band 14.

In accordance with one embodiment, all the grooves 105, 107, 109, 111, 113 of a second module 43 comprise one end 116 aligned with each other in the same circumferential direction near the outer edge 22 of band 14.

In accordance with one embodiment, the inner edge 20 of band 14 has at least one raised portion 117 or window open towards the inner radial direction facing the rotation axis A-A, which locally reduces the radial thickness of the braking band 14.

In accordance with one embodiment, the inner edge 20 of band 14 has a plurality of raised portions 117.

In accordance with one embodiment, the inner edge 20 of band 14 has a plurality of raised portions 117 positioned circumferentially equidistant from each other.

In accordance with one embodiment, the outer edge 22 of band 14 has at least one recessed portion 118 or window open towards the outer radial direction facing the side opposite to the rotation axis A-A, which locally reduces the radial thickness of the braking band 14.

In accordance with one embodiment, the outer edge 22 of band 14 has a plurality of recessed portions 118.

In accordance with one embodiment, the outer edge 22 of band 14 has a plurality of recessed portions 118 positioned circumferentially equidistant from each other.

In accordance with one embodiment, running along said raised portion or step 117 or said recessed portion or depression 118 in a circumferential direction, a closed radial groove 119 is provided near the beginning of said step 117 or depression 118, which groove extends along the entire braking band 14 or at least a portion thereof touched by a brake pad, without leading to said inner 20 or outer edge 22.

In accordance with one embodiment, running along said raised portion or step 117 or said recessed portion or depression 118 in a circumferential direction, a depression 118 starts where a step 117 ends, and a step 117 starts where a depression 118 ends.

In accordance with one embodiment, said steps 117 and said depressions 118 are mutually separated by a closed radial groove 119.

In accordance with one embodiment, the inner edge 20 of band 14 has at least one inner bevelled portion 120 or a chamfer on at least one edge which joins said edge 20 to said braking surface and/or 18 and of a circumferential extension defined at a predefined angle.

In accordance with one embodiment, the inner edge 20 of band 14 has a plurality of bevelled portions 120.

In accordance with one embodiment, the inner edge 20 of band 14 has a plurality of bevelled portions 120 positioned circumferentially equidistant from one another.

In accordance with one embodiment, the outer edge 22 of band 14 has at least one outer bevelled portion 121 or chamfer on at least one edge which joins said edge 20 to said braking surface 16 and/or 18 and of a circumferential extension defined at a predefined angle.

In accordance with one embodiment, the outer edge 22 of band 14 has a plurality of bevelled portions 121.

In accordance with one embodiment, the outer edge 22 of band 14 has a plurality of bevelled portions 121 positioned circumferentially equidistant from one another.

In accordance with one embodiment, running along said inner bevelled portion or inner chamfer 120 or said outer bevelled portion or outer chamfer 121 in a circumferential direction, near the beginning of said inner chamfer 120 or outer chamfer 121, a closed radial groove 122 is provided, which extends along the entire braking band 14, or at least along the portion thereof touched by a brake pad, without leading to said inner 20 or outer 22 edge.

In accordance with one embodiment, running along said inner bevelled portion or inner chamfer 120 or said outer bevelled portion or outer chamfer 121 in a circumferential direction, an outer chamfer 121 starts where an inner chamfer 120 ends, and an inner chamfer 120 starts where an outer chamfer 121 ends.

In accordance with one embodiment, said inner chamfers 120 and said outer chamfers 121 are mutually separated by a closed radial groove 122.

The present invention also relates to a disc of a disc brake comprising a braking band according to any one of the above-described embodiments.

Several and various distributions of grooves on the braking surfaces arranged for various purposes, often mutually opposed, are known. The original distribution claimed allows to reach an optimal compromise between opposed objectives, in particular by enhancing the braking efficiency and the discharge of the abraded material, the abrasion uniformity and the elimination of the vibrations caused on the disc and on the brake pad when they interact during the braking action. The original arrangement of the grooves allows the aforesaid effects to be achieved both radially and tangentially as evenly as possible.

The interaction between the friction material and the edge of a groove creates, on the brake pad, a slight stress with a component in radial direction. Providing a module inclined in one direction and a module inclined in the other direction and circumferentially alternating along the braking surface allows the direction of the two radial components on the brake pad to be alternated.

The effect of one module can be compared to the effect of the second module.

Actually, the alternation of the two effects could generate an undesired vibration during the braking. This disadvantage is optimally compensated for by the compactness and uniformity of the distribution ensured by the presence of two modules, which can be better positioned with respect to the braking surface, in addition to the opposite inclination thereof. The alternation of two modules having opposite inclinations allows the available braking surface to be better utilized, thus filling it in an optimal manner and with effects distributed more evenly. In other words, the distribution between solids and voids with reference to the presence and absence of the grooves is more compact and more variously distributed as compared to sequences of grooves with the same inclination.

The risk of vibrations is thus compensated for by the compactness and uniformity of distribution of the grooves. In accordance with one embodiment, the narrow angular extension of the module and the proximity between adjacent modules, or in other words, the fact that the above-defined contact area covers at least a pair of modules, further limits the risk of vibrations and allows the single positive effects of the grooves to be exerted simultaneously on the friction material of the brake pad, thus annulling the individual negative effects.

In particular, the risk of vibrations due to the inclination alternation as defined above becomes null, thus leaving only the advantageous effects of an even wear of the brake pads.

Each of the aforesaid modules allows for example the average friction between the brake pad and the braking surface to be increased, thus allowing the contact area with the brake pad to be filled as much as possible. Such a positive effect is even more accentuated when the contact area has a circumferential and possibly radial extension equal to that of at least a pair of modules.

The inclusion of the aforesaid grooves having a concavity with vector according to the rotation R and inclined with respect to the circumferential midline towards the inside of the disc contributes with an effect which is unusually particularly efficient especially in achieving a very high average friction coefficient. This effect alone could also be excessive and therefore disadvantageous, and can be compensated for by the presence of the grooves which have a concavity with vector according to the rotation direction but facing towards the outside with respect to the average circumferential direction.

The long groove further allows the evacuation of the abraded dust to be facilitated, since it continuously extends more or less over the entire "scraped" height of the braking surface.

In other words, the long groove allows the dust of the material abraded by the braking action to be collected and continuously conveyed towards the outer edge of the braking band to be evacuated.

Such an effect is increased by the concavity of the long groove, and in particular, by the concavity with vector according to the rotation direction R.

Furthermore, the long groove is substantially like a spoon which collects the abraded material from the inside of the disc and continuously brings it outside.

The braking action is also more even, and so is the flow of the forces along the braking surface, which follows the distribution of the "solids" between the grooves. In a parallel arrangement of the grooves, the brake pad compresses a circumferential alternation of "voids" and "solids" which substantially extend over the entire "scraped" height of the braking band, thus generating a short alternation in the braking force applied on the disc. The compact distribution obtained along with the variability of the radial position of "voids" and "solids" allows such an effect to be minimized.

Furthermore, the original arrangement of the grooves allows them to be compacted in the circumferential direction while however maintaining an area with no grooves variously distributed both in radial and circumferential direction on which the brake pad can transmit the force. In other words, the area suitable to transmit the forces is distributed in a balanced manner and so are the forces, so that the "center of gravity" of the subsequent action on the contact area generated by the braking action does not move excessively during the touching operation.

In the case of a ventilated band, providing the grooves to intersect the projection on the braking surface of at least one wing allows the material between two wings not to be weakened, the thickness of which is already limited by the presence of the ventilation channel. The centrifugal effect of the grooves is improved due to the inclination and concavity thereof, and the aeration effect is improved by providing the inclination and concavity of the wings.

It is apparent that variants and/or additions can also be made to the above description and disclosure.

For example, the band and the bell can be made in a single piece.

The connection elements between the two plates can be made by means of pegs which, in accordance with one embodiment, according to one possible embodiment, are in sequence passing from the inside to the outside of the band along a line which extends like the main direction of extension of the wings.

The description is directed to the distribution of the grooves on one of the braking surfaces. The other braking surface can have a symmetrical distribution with respect to a mid-plane of the braking band perpendicular or opposed to axis A-A. According to one possible embodiment, the grooves of a braking surface are in-phase with those of the opposite braking surfaces. According to one possible embodiment, the grooves of a braking surface are out-of-phase by half a step with respect to those of the opposite braking surfaces.

In accordance with a further embodiment, the grooves of a module can be symmetrical with respect to a diameter, thus separating the inclination direction, and the possible concavity, from the main rotation direction of the vehicle.

Those skilled in the art can make several changes and adaptations to the above-described embodiments of the braking band, and can substitute elements with others which are functionally equivalent, in order to meet contingent, specific needs, without however departing from the scope of the following claims.

The invention claimed is:

1. Braking band of a disc for a disc brake suitable to rotate around a rotation axis, said braking band comprising opposite annular braking surfaces which extend from an inner edge, facing towards the rotation axis, to an outer edge, facing the outside of the disc, said braking band having a distribution of grooves on at least one of the braking surfaces, said distribution of grooves having a pattern or module which is repeated circumferentially, each of said grooves being a closed groove which extends in a main direction of extension which defines a direction of said groove, each groove further extending without intersecting other grooves, said module extends from an inner radius to an outer radius, said radii defining an annular portion of said braking surface having said grooves, said module comprising a first groove, which extends without interruption substantially from said inner radius to said outer radius, as well as at least a second and a third groove with lesser extensions than said first groove, said first, second and third groove of the same module have path extensions parallel to each other,
wherein:
said second groove has a greater extension than said third groove, and
said at least first, second and third grooves are positioned alongside each other and said second groove is positioned between said first groove and said third groove, and the extension of said first groove is suitable to affect the entire area contacted by at least one brake pad suitable to act in conjunction with said annular braking surface to exert a braking action, and which at any point in the direction of extension of each groove, said direction of extension, or its rectilinear prolongation, forms an acute angle with respect to a radial direction or a prolongation of the inner radius or of the outer radius.

2. Braking band according to claim 1, wherein each module includes five grooves; and/or wherein
in each module, said third groove has a greater extension than said fourth groove; and/or wherein
in each module said fourth groove has a greater extension than said fifth groove; and/or wherein
in each module said five grooves are alongside each other and have a decreasing extension starting from the first groove; and/or wherein
at least one of said grooves extends in a main direction of extension of a curved shape; and/or wherein
each of said grooves extends in a main direction of extension of a curved shape; and/or wherein all the grooves of the same module extend in a main direction of extension of a curved shape and having the same curvature.

3. Braking band, according to one of the embodiments of claim 2, wherein at least one module has grooves which extend in a curved direction and in which at each point the radius of curvature of said main direction of extension, or its prolongation, opens an acute angle with the tangential or circumferential direction of said braking band, and/or wherein
said radius of curvature, starting from the tangential direction, opens an angle towards the rotation axis of the band; and/or wherein
said curved direction is facing towards the inner edge of the braking band.

4. Braking band, according to one of the embodiments of claim 2, wherein at least one module has grooves which extend in a curved direction and in which at each point the radius of curvature of said main direction of extension or its prolongation, opens an acute angle with the tangential or circumferential direction of said braking band, and/or wherein said radius of curvature, starting from the tangential direction, opens an angle opposite the rotation axis of the band; and/or wherein said curved direction is facing towards the outer edge of the braking band.

5. Braking band, according to claim 1, wherein at least five modules are provided, of an identical shape to each other, which are repeated circumferentially and equally spaced from each other to form a configuration similar to the radii of a five-pointed star; and/or wherein
each of the five modules has grooves which extend in a curved direction and in which at each point the radius of curvature of said main direction of extension or its prolongation, opens an acute angle with the tangential or circumferential direction of said braking band, and/or wherein
said radius of curvature, starting from the tangential direction, opens an angle towards the rotation axis of the band; and/or wherein
said curved direction is facing towards the inner edge of the braking band.

6. Braking band, according to claim 1, wherein at least five modules are provided, of an identical shape to each other which are repeated circumferentially and equally spaced from other to form a configuration similar to the radii of a five-pointed star; and/or wherein
each of the five modules has grooves which extend in a curved direction and in which at each point of the radius of curvature of said main direction of extension or its prolongation, opens an acute angle with the tangential or circumferential direction of said braking band, and/or wherein said radius of curvature, starting from the tangential direction, opens an angle opposite the rotation axis of the band; and/or wherein
said curved direction is facing towards the outer edge of the braking band.

7. Braking band according to claim 1, wherein all the grooves of the same module comprise ends aligned with each other in the same circumferential direction; and/or wherein
all the grooves of a first module comprise one end aligned with each other in the same circumferential direction near the inner edge of the band; and/or wherein
all the grooves of a second module comprise one end aligned with each other in the same circumferential direction near the outer edge of the band.

8. Braking band according to claim 1, wherein the inner edge of the band has at least one raised portion or window, open towards the inner radial direction facing the rotation axis which locally reduces the radial thickness of the braking band; and/or wherein
the inner edge of the band has a plurality of raised portions; and/or wherein
the inner edge of the band has a plurality of raised portions positioned circumferentially equidistant from each other; and/or wherein
the outer edge of the band has at least one lowered portion or window open towards the outer radial direction pointing away from the rotation axis which locally reduces the radial thickness of the braking band; and/or wherein the outer edge of the band has a plurality of lowered portions; and/or wherein
the outer edge of the band has a plurality of lowered portions positioned circumferentially equidistant from each other; and/or wherein
running along said raised portion or step or recessed portion or depression in a circumferential direction near the beginning of said step or depression a closed radial groove is provided which extends all along the braking band or at least a portion of this touched by a brake pad, without extending onto said inner or outer edge; and/or wherein
running along said raised portion or step or recessed portion or depression in a circumferential direction, where a step stops, a depression starts and where a depression stops a step starts; and/or wherein
said steps and depressions are mutually separated by a closed radial groove.

9. Braking band, according to claim 1, wherein the inner edge of the band has at least one inner beveled portion or a chamfer on at least one corner or edge which joins said edge to said braking surface and of a circumferential extension defined at a predefined angle; and/or wherein the inner edge of the band has a plurality of beveled portions; and/or wherein the inner edge of the band has a plurality of beveled portions positioned circumferentially equidistant from each other; and/or wherein the outer edge of the band has at least one outer beveled portion or chamfer on at least one edge which joins said edge to said braking surface and of a circumferential extension defined at a predefined angle; and/or wherein the outer edge of the band has a plurality of beveled portions; and/or wherein the outer edge of the band has a plurality of chamfered portions placed circumferentially equidistant from each other; and/or wherein running along said inner beveled portion or inner chamfer or said outer beveled portion or chamfer in a circumferential direction, near the beginning of said inner chamfer or outer chamfer a closed radial groove is provided which extends all along the braking band or at least the portion of this touched by a brake pad, without extending onto said inner or outer edge; and/or wherein running along said inner beveled portion or inner chamfer or said outer beveled portion or chamfer in a circumferential direction, where an inner chamfer ends, an outer chamfer starts and where an outer chamfer ends, an inner chamfer starts; and/or wherein said inner chamfers and said outer chamfers are mutually separated by a closed radial groove.

10. Disc of a disc brake comprising a band according to claim 1.

* * * * *